May 1, 1934.   G. WALMSLEY   1,956,841
ELECTROMAGNETIC HOLDING DEVICE FOR FACILITATING WELDING OPERATIONS
Filed July 21, 1930   2 Sheets-Sheet 1

INVENTOR.
GEORGE WALMSLEY
BY
ATTORNEY.

May 1, 1934.  G. WALMSLEY  1,956,841
ELECTROMAGNETIC HOLDING DEVICE FOR FACILITATING WELDING OPERATIONS
Filed July 21, 1930    2 Sheets-Sheet 2

INVENTOR.
GEORGE WALMSLEY
BY
ATTORNEY.

Patented May 1, 1934

1,956,841

UNITED STATES PATENT OFFICE 1,956,841

ELECTROMAGNETIC HOLDING DEVICE FOR FACILITATING WELDING OPERATIONS

George Walmsley, Philadelphia, Pa., assignor to Edward G. Budd Manufacturing Company, Philadelphia, Pa., a corporation of Pennsylvania Application July 21, 1930, Serial No. 469,426

7 Claims. (Cl. 219—17)

This invention relates to electro-magnetic holding devices, but more particularly a holding device for door panels for holding the same firmly in position while performing the spot welding operation on the overlapping edge flanges.

In forming the spot welding operation upon door panels or upon similar work, it has been customary to apply a fixed voltage to the work by securing one end of a conductor, leading from one terminal of a secondary coil, to the work at any suitable point in order that current may flow from the work to the point of the welding tool connected to the other terminal of the secondary coil, or vice versa, in order that the metal may be welded at the point of contact with the welding tool. Considerable difficulty has been encountered in effectively establishing an electric contact with the work to establish an applied voltage through the same. The present invention contemplates the provision of an apparatus which will effectively clamp the work against one or more brushes connected to one end of a conductor leading from a terminal of a secondary coil. Toward this end, the invention consists in an extremely simple apparatus comprising a powerful electro-magnet mounted on a rugged frame carrying a pair of resilient brushes having contacting surfaces adapted to bear against the work in a plane in line with the operative attracting face of the electro-magnet. A suitable follower is provided and is adapted to be placed behind the work to draw the work against the electro-magnet to contact with the brushes, the electro-magnet exerting its magnetic force not only upon the work itself, but upon the follower behind the work in order that the work may more powerfully be drawn against the brushes which carry the welding current.

Figure 1:
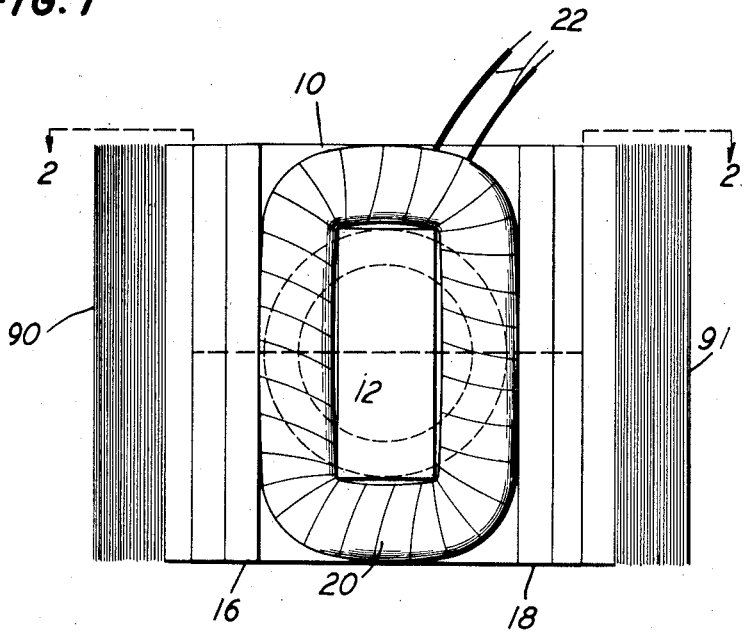
Figure 2:
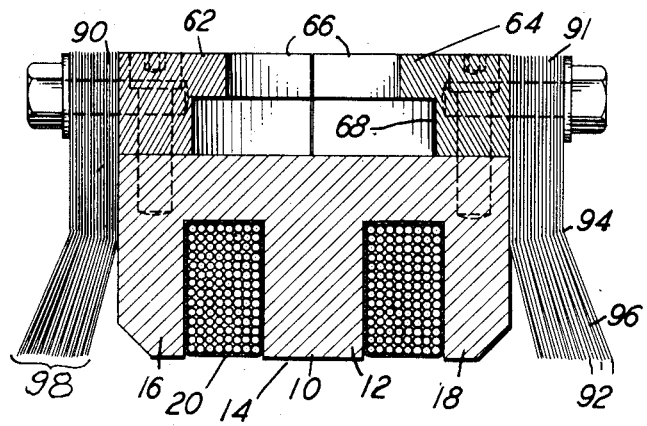
Figure 3:
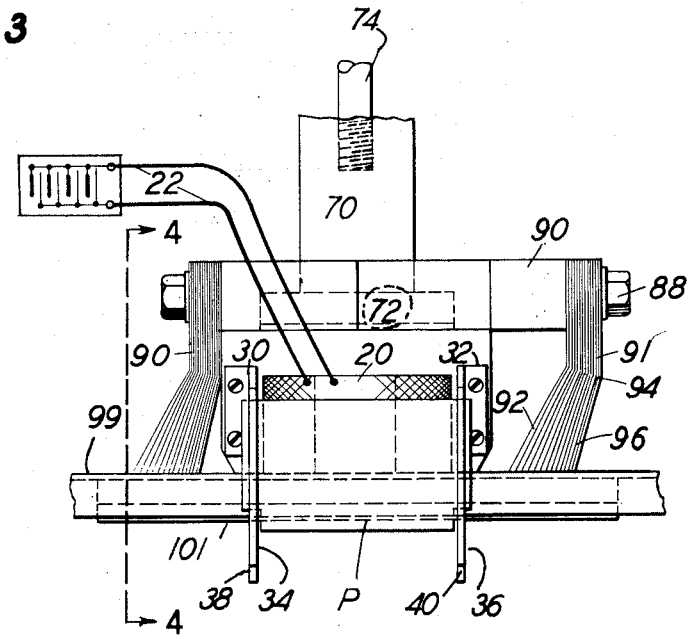
Figure 4:
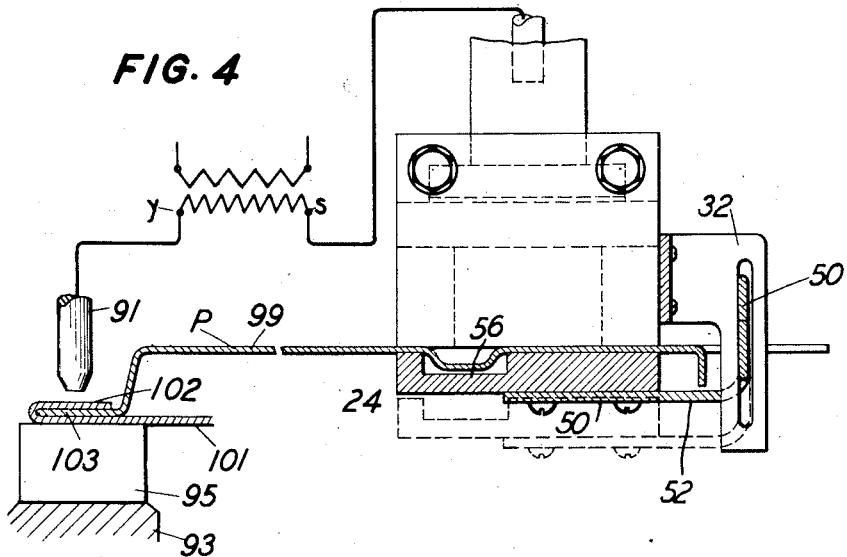

In the accompanying two sheets of drawings, one embodiment of the invention is shown, and in these drawings, Fig. 1 is an underneath plan view of the holding device, the follower and its attaching means being omitted to more clearly illustrate the nature of the invention, and Fig. 2 is a sectional view taken substantially on the line 2—2 of Fig. 1 in the direction of the indicating arrows, and Fig. 3 is a side elevation of the modified form of the device showing the same in actual operation, holding a door panel for performing a welding operation, and Fig. 4 is a sectional view taken substantially along the line 4—4 of Fig. 3.

In both of the above described views, like characters of reference are employed to designate like parts throughout, and referring to Figs. 1 and 2, the device involves in its general organization a U-shaped plate 10 having formed thereon a central core 12, having a lower face 14 against which the door panel is adapted to be firmly clamped by electro-magnetic force. Disposed about the core 12 and between the side walls 16 and 18 of the U-shaped member 10 is an electric coil 20 having lead-in wires 22 leading from a suitable source of current, as for example, a battery, and adapted to energize the core 12 to draw the door panel shown at P, shown in Fig. 3. The bottom faces of the depending walls 16 and 18 lie substantially in the plane of the lower face of the core 12 and are adapted in conjunction with the keeper 24 (Fig. 4) to prevent tilting of the door panel on the attracting core.

Secured to the side walls of the U-shaped member 10 are a pair of brackets 30 and 32 having depending arms 34 and 36 respectively provided with slots 38 and 40 formed therein and slidable within these slots is a plate 50 having a horizontal portion 52 underlying the core 12. This plate has secured thereto the keeper member 24 and this latter member may have its upper surface indented, as for example, at 56 to avoid irregular configuration of the door panel and to prevent damage to the same during the holding operation.

The above described parts comprise the electromagnet holding assembly, and the means for impressing a welding current voltage on the door panel will now be described.

The iron U-shaped member 10 has secured to its upper surface by means of counter-sunk bolts, a pair of copper retaining members 62 and 64, which members are also contact members. These members are generally semi-cylindrical in shape, and when assembled in position on the U-shaped member 10, the inner portion, as shown in Fig. 2, provides a continuous overlying flange 66 and a recess 68 therebeneath, in which there is received an end of a bushing 70 having an enlarged head 72 confined within the recess 68. The bushing 70 receives therein an end of a conductor 74, which conductor is connected to one of the secondary terminals of a transformer for applying the welding current to the work. Securely fastened to each of the members 62 and 64 by means of bolts 88, is a copper brush member, which members are shown at 90 and 91, respectively. Each of these brushes are in the form of a plurality of copper leaves 92 bent as at 94 and spread outwardly as at 96 to a horizontal contacting surface 98 at the ends of the leaves for engagement with the work P. The lower ends of the leaves 96 terminate in a common plane slightly below the plane of the surface 14 of the electro-magnetic core 12 in order that, as the work is drawn upwardly against the attracting surface 40 the copper leaves will firmly receive the work thereagainst and the leaves will be enabled by their pressure on the door panel to effect good conduction of the welding current into the body of the door panel.

The spot welding apparatus is shown in Fig. 4. A door panel is shown at P. This door panel is comprised of an outer door panel 101 and inner door panel 99. The outer door panel is provided with a flange 102 which overlaps a flange 103 of the inner door panel. The overlapped portion of the door panel flanges are spot welded together and in order to accomplish this spot welding operation, an insulating block 95 supported on a foundation 93 underlies the outer and inner door panel flanges. A welding tool 91' is shown as being positioned for contact with the overlying flange 102. The welding tool may be of any well known type and is connected to the end $y$ of the secondary coil S of a welding transformer.

In order to carry out the spot welding operation the welding tool is made to contact with the overlying flange 102 and as soon as contact is made, and a predetermined pressure is attained, current flows from conductor 74 through members 62 and 64 and through copper leaves 96 and into the door panels through the super-imposed flanges to the welding point and thus the welding circuit is completed. The lead-in wires 22 of the coil 20 are shown as carrying a current of six volts which may be supplied from an ordinary storage battery, this voltage being sufficient to attract the follower 24 with sufficient force to clamp the door panel firmly against the brushes 90 and 91, in order that current may be impressed upon the door panel.

In the form of the invention just described, when the door panel is brought to bear against the brushes 90 and 91, the contacting ends of the brushes are slightly spread upon the door panel, and because the brushes are inclined outwardly in opposite directions, considerable lifting force must be exerted by the core 12. In certain circumstances it is deemed preferable to attach brushes in the manner shown in Fig. 3. In this figure, the brushes 90 and 91 are inclined in the same direction with respect to the axis of the core. Toward this end the brush 91 is secured to the copper retaining members 62 and 64 as in the case of Fig 3. However, in order to permit reverse inclination of the brush, spacing member 90' is interposed between the brush and retaining member 64, and thus the lower end of the brush may be inclined inwardly of the device so that when the door panel engages the brushes, there will be a slight lateral movement of the door panel to spread the brushes until the panel contacts with the lifting core.

I do not desire to limit myself to the exact arrangement of parts shown in the accompanying two sheets of drawings or described in this specification, as various changes in the details of construction may be resorted to without departing from the spirit of the invention. Only insofar as the invention has been particularly pointed out in the accompanying claims is the same to be limited.

What I claim is:—

1. In a device for effecting electrical contact with an article to be welded, a pair of yielding current carrying contacts spaced apart and having contacting faces lying substantially in the same plane, an electro-magnet disposed between said contacts having an attraction face disposed in a plane substantially parallel to said first-mentioned plane and slightly behind the same, and means for applying current to said electro-magnet to cause the article to be welded to be drawn against the attracting surface of the core and contact with said yielding contacts.

2. In a device for effecting electrical contact with an article to be welded, a pair of yielding current carrying contacts having a contacting surface lying substantially in the same plane, an electromagnet having a coil wound core, the braking surface of which lies slightly behind said first-mentioned plane, a pair of limit stops lying in said last-mentioned plane, and means for applying a current to the coil of said electro-magnet to draw the article to be welded against said limit stops to engage said contacts and distort the contacting surface of the same into said second mentioned plane.

3. A device for effecting electrical contact with an article to be welded comprising a yielding contact having a contacting surface, an electromagnet comprising a coil wound core having an attracting surface lying in a plane exclusive of said contacting surface, and means for applying a current to the coil of said electromagnet to draw an article to be welded against said attracting surface to engage said contacting surface and yieldingly force the same into said plane.

4. In a device for effecting electrical contact with an article to be welded, yielding spaced current carrying contacts, electro-magnetic means disposed between said current carrying contacts for drawing the article to be welded against said yielding current contacts, and a keeper adapted to engage said article on the side of the same remote from said electro-magnetic means, and draw the article against said electro-magnetic means.

5. In a device for effecting electrical contact with an article to be welded, yielding spaced current carrying contacts, electro-magnetic means disposed between said current carrying contacts for drawing the article to be welded against said yielding current contacts, and a slidable keeper adapted to engage said article on the side of the same remote from said electro-magnetic means, and draw the article against said electro-magnetic means.

6. A device for effecting electrical contact with an article to be welded, comprising in combination, a flexible current carrying contact, electro-magnetic means arranged to hold said article against said flexible contact.

7. In a device for effecting the electrical contact with an article to be welded, the combination of, a pair of flexible spaced current carrying contacts, electro-magnetic means disposed between said current carrying contacts whereby to hold said article to be welded against said flexible current carrying contacts.

GEORGE WALMSLEY.